United States Patent
Koshimizu et al.

(10) Patent No.: US 8,385,182 B2
(45) Date of Patent: Feb. 26, 2013

(54) OPTICAL PICKUP APPARATUS

(75) Inventors: Yuki Koshimizu, Kashiwa (JP);
Hiroyuki Ichikawa, Hanno (JP)

(73) Assignees: Sanyo Electric Co., Ltd. (JP); Sanyo Optec Design Co., Ltd. (JP)

( * ) Notice: Subject to any disclaimer, the term of this patent is extended or adjusted under 35 U.S.C. 154(b) by 6 days.

(21) Appl. No.: 13/215,787

(22) Filed: Aug. 23, 2011

(65) Prior Publication Data

US 2012/0069724 A1 Mar. 22, 2012

(30) Foreign Application Priority Data

Aug. 26, 2010 (JP) .................. 2010-189621

(51) Int. Cl.
*G11B 7/00* (2006.01)

(52) U.S. Cl. ......... 369/112.22; 369/112.16; 369/112.05; 369/94

(58) Field of Classification Search ............. 369/94, 369/44.23, 44.37, 44.41, 112.05, 112.16, 369/112.22, 112.01, 112.18
See application file for complete search history.

(56) References Cited

U.S. PATENT DOCUMENTS

| | | | | |
|---|---|---|---|---|
| 8,054,733 B2* | 11/2011 | Nagatomi | ............... | 369/112.03 |
| 8,072,868 B2* | 12/2011 | Kouno | ................... | 369/112.19 |
| 2007/0223349 A1* | 9/2007 | Shimada et al. | ......... | 369/112.22 |
| 2007/0263521 A1* | 11/2007 | Ichimura et al. | ......... | 369/112.05 |
| 2008/0219119 A1* | 9/2008 | Izumi et al. | ............... | 369/53.17 |
| 2009/0201787 A1* | 8/2009 | Ogasawara et al. | ...... | 369/112.23 |
| 2009/0310468 A1* | 12/2009 | Kimura | .................... | 369/112.23 |
| 2010/0091634 A1* | 4/2010 | Murata et al. | ............ | 369/112.23 |

FOREIGN PATENT DOCUMENTS

| JP | 2009076187 A | 4/2009 |
|---|---|---|
| JP | 2009176367 A | 8/2009 |

* cited by examiner

*Primary Examiner* — Thang Tran
(74) *Attorney, Agent, or Firm* — Cantor Colburn LLP (57) ABSTRACT

An optical-pickup apparatus includes: a laser diode; an objective lens; a diffraction grating; a photodetector including main-beam-, first-sub-beam-, and second-sub-beam-light-receiving portions; a quarter-wave plate having either a second area allowing a reflected-laser beam to pass therethrough without polarization or a third area allowing the reflected beam to pass therethrough at a polarization angle different from that of the first area; and a polarizing member having a separate-light-amount ratio set therefor with respect to the reflected beams passing through the second or third area and an area excluding the second or third area from the first area, such that proportions of the reflected beams passing therethrough toward the photodetector are different, thereby decreasing an irradiation level when the first- and second-sub-beam-light-receiving portions are irradiated, as stray light, with the reflected beam reflected from either one, not subjected to a signal-reading operation, of the first- and second-signal-recording layers of an optical disc.

15 Claims, 7 Drawing Sheets

OPTICAL PICKUP APPARATUS

CROSS-REFERENCE TO RELATED APPLICATION

This application claims the benefit of priority to Japanese Patent Application No. 2010-189621, filed Aug. 26, 2010, of which full contents are incorporated herein by reference.

BACKGROUND OF THE INVENTION

1. Field of the Invention

The present invention relates to an optical pickup apparatus configured to perform an operation of reading signals recorded in an optical disc and an operation of recording signals into an optical disc using a laser beam.

2. Description of the Related Art

Optical disc apparatuses are widely used which are capable of performing a signal reading operation and a signal recording operation by irradiating a signal recording layer of an optical disc with a laser beam emitted from an optical pickup apparatus.

The operation of reading signals recorded on a signal recording layer using an optical pickup apparatus is performed by irradiating the signal recording layer with a laser beam emitted from a laser diode and by detecting a change in the laser beam reflected from the signal recording layer using a photodetector.

The optical pickup apparatus includes a polarizing member configured to guide the laser beam emitted from the laser diode toward an objective lens through an operation of allowing the beam to pass therethrough or reflecting it therefrom, and configured to guide return light reflected from the signal recording layer of the optical disc toward the photodetector through the operation of allowing the light to pass therethrough or reflecting it therefrom, and an optical component called a semitransparent mirror or a polarizing beam splitter is commonly used as the polarizing member. A configuration is such that an operation of splitting the laser beam by such a polarizing member is to be performed by utilizing an operation of changing a polarization direction of polarized light using an optical component called a quarter-wave plate, i.e., an operation of converting from linearly polarized light into circularly polarized light and an operation of converting from circularly polarized light into linearly polarized light.

An optical disc including signal recording layers of a plurality of layers instead of one layer, for example, a two-layer optical disc including those of two layers, is recently commercialized, and an optical pickup apparatus, capable of performing an operation of reading signals recorded on the signal recording layers of the optical disc including such a plurality of signal recording layers, is also commercialized.

In optical pickup apparatuses, any one of a three-beam method, a push-pull method, a phase difference method, and applications thereof is employed in accordance with a standard of an optical disc and a type of a medium, as a tracking control method by which the laser beam applied to the optical disc is caused to follow a signal track formed on the signal recording layer.

On the other hand, an astigmatic method and applications thereof are often employed for focus control by which the laser beam irradiating the optical disc is focused on the signal recording layer of the optical disc.

If the differential push-pull method or the three-beam method is employed as the tracking control method and if the differential astigmatic method is employed as the focus control method, the signal recording layer of the optical disc is required to be irradiated with three beams. Thus, the optical pickup apparatus which employs any of these methods includes: a diffraction grating configured to diffract the laser beam emitted from the laser diode into zero-order light and plus and minus first-order diffracted light and form three beams; and a photodetector having light-receiving areas for respectively receiving three reflected light beams which are obtained by reflecting these three beams by the signal recording layer of the optical disc.

Figure 7:
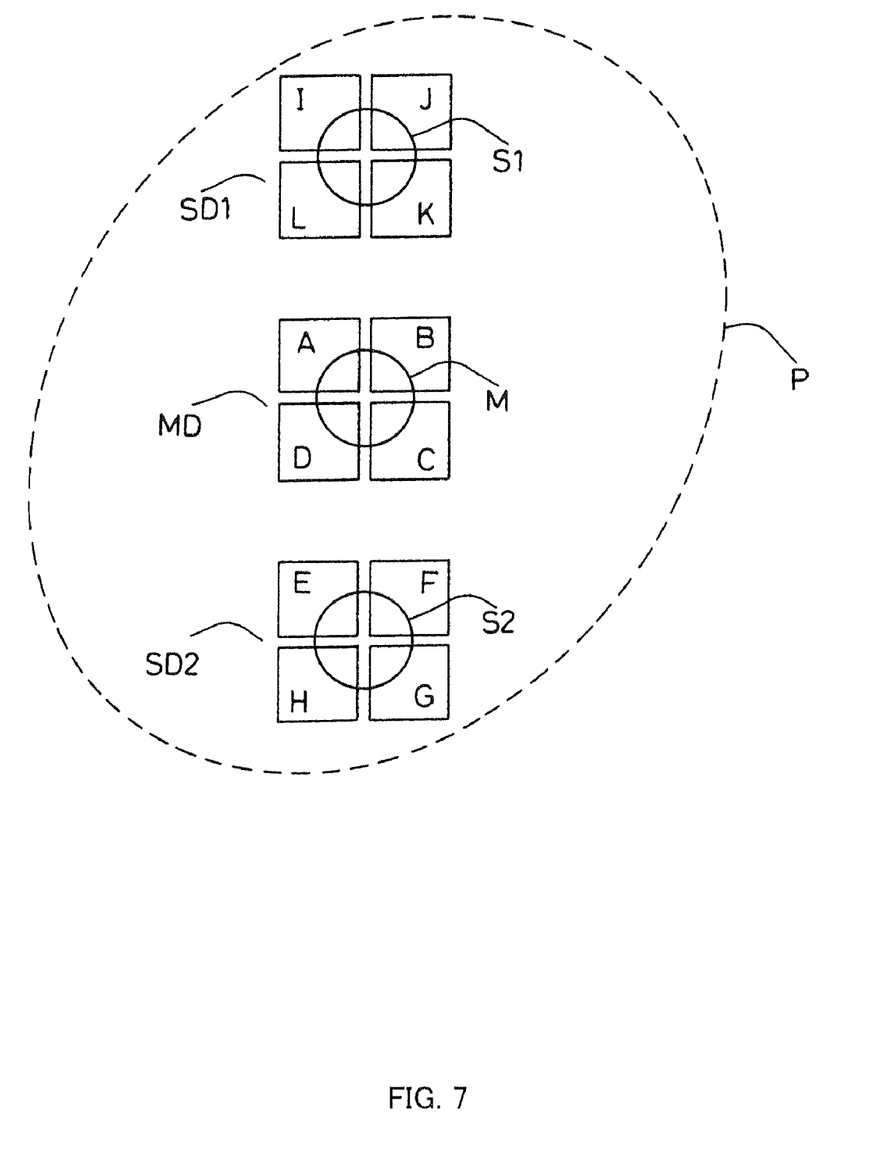
FIG. 7 is a diagram for explaining a relationship between a photodetector and a laser beam of a common optical pickup apparatus.

FIG. 7 depicts an example of a light-receiving surface of the photodetector including the light-receiving areas where the reflected light beams of the three beams are respectively received.

The photodetector depicted in FIG. 7 includes a main-beam light-receiving portion MD irradiated with a main beam M of zero-order light, a preceding sub-beam light-receiving portion SD1 irradiated with a preceding sub-beam S1 of plus first-order diffracted light, and a following sub-beam light-receiving portion SD2 irradiated with a following sub-beam S2 of minus first-order diffracted light.

In the photodetector, the main-beam light-receiving portion MD, the preceding sub-beam light-receiving portion SD1, and the following sub-beam light-receiving portion SD2 as described above are arranged in the same straight line, and a configuration is such that a direction in which they are arranged coincides with a tracking control direction, i.e., a direction in which the main beam M, the preceding sub-beam S1, and the following sub-beam S2 respectively applied to the main-beam light-receiving portion MD, the preceding sub-beam light-receiving portion SD1, and the following sub-beam light-receiving portion SD2 are displaced when a spot condensed and formed by the objective lens is displaced in a radial direction of an optical disc D.

Each of the main-beam light-receiving portion MD, the preceding sub-beam light-receiving portion SD1, and the following sub-beam light-receiving portion SD2 is configured with a sensor divided into four as depicted. A configuration is such that a signal recorded in the optical disc D is read as a readout signal by performing additions with respect to signals according to the light amounts of the main beam applied to all the sensors A, B, C, and D included in the main-beam light-receiving portion MD.

A focus error signal is generated such that the signals acquired from the sensors in one diagonal relationship in the four-divided sensor included in the main-beam light-receiving portion MD are added, and from such an addition signal, a signal obtained by adding signals acquired from the sensors in the other diagonal relationship are subtracted, and this focus error signal is utilized for performing a focusing control operation. Such a focusing control operation corresponds to a focusing control method called an astigmatic method, which will not be described.

In contrast to the astigmatic method, a configuration is such that a sub-focus error signal is generated such that signals acquired from the sensors in one diagonal relationship in the four-divided sensors included in each of the preceding sub-beam light-receiving portion SD1 and the following sub-beam light-receiving portion SD2 are added, and from such an addition signal, a signal obtained by adding signals acquired from the sensors in the other diagonal relationship are subtracted, and a focus error signal is generated by performing an arithmetic operation on these sub-focus error signals and a main focus error signal acquired from the four-divided sensor included in the main-beam light-receiving portion MD, thereby performing the focusing control operation. Such a focusing control operation is a control method called a differential astigmatic method.

The focusing control operation by the above differential astigmatic method will then be described. Such a focusing control operation is performed using the main focus error signal and the sub-focus error signal generated from the main-beam light-receiving portion MD, the preceding sub-beam light-receiving portion SD1, and the following sub-beam light-receiving portion SD2 as described above.

The main focus error signal is acquired such that signals acquired from two sensors A and C of the four-divided sensor included in the main-beam light-receiving portion MD are added, and from such an addition signal, a signal obtained by adding signals acquired from two sensors B and D is subtracted.

A first control signal is acquired such that signals acquired from two sensors I and K of the four-divided sensor included in the preceding sub-beam light-receiving portion SD1 are added, and from such an addition signal, a signal obtained by adding signals acquired from two sensors J and L is subtracted; a second control signals is acquired such that signals acquired from two sensors E and G of the four-divided sensor included in the following sub-beam light-receiving portion SD2 are added, and from such an addition signal, a signal obtained by adding signals acquired from two sensors F and H is subtracted; and the sub-focus error signal is acquired by performing arithmetic processing on the first control signal and the second control signal acquired as such.

A configuration is such that the focus error signal by the differential astigmatic method is acquired by subtracting the sub-focus error signal acquired from the preceding sub-beam light-receiving portion SD1 and the following sub-beam light-receiving portion SD2 from the main focus error signal acquired from the main-beam light-receiving portion MD.

The operation of generating such a focus error signal will then be described with reference to reference numerals of the sensor units depicted in FIG. 7. If the main focus error signal is denoted by MFE, MFE=(A+C)−(B+D), and if the sub-focus error signal is denoted by SFE, $$SFE=\{(E+G)-(F+H)\}+\{(I+K)-(J+L)\}.$$

The focusing control operation by such a differential astigmatic method is performed based on a differential push-pull signal DPP, and this DPP signal is acquired by DPP=MFE−k1×SFE, where k1 is a constant which is determined based on the light intensity of the main beam and the light intensity of the sub-beams.

Such an optical pickup apparatus has been developed, which is configured to perform the focusing control operation using a combination of the main beam and the sub-beams as described above, and a tracking control operation of the optical pickup apparatus having such a configuration will then be described.

Such a tracking control operation is performed by an operation of irradiating the preceding sub-beam light-receiving portion SD1 with the preceding sub-beam S1 and an operation of irradiating the following sub-beam light-receiving portion SD2 with the following sub-beam S2.

For example, a first control signal is acquired such that signals acquired from the two sensors I and J on the upper side of the four-divided sensor included in the preceding sub-beam light-receiving portion SD1 are added, and from such an addition signal, a signal obtained by adding signals acquired from the two sensors L and K on the lower side is subtracted; a second control signal is acquired such that signals acquired from the two sensors E and F on the upper side of the four-divided sensor included in the following sub-beam light-receiving portion SD2 are added, and from such an addition signal, a signal obtained by adding signals acquired from the two sensors H and G on the lower side is subtracted; and a tracking error signal is generated by performing arithmetic processing on the first control signal and the second control signal acquired as such, however, such an operation is well-known and will not be described.

In addition to the above-described tracking control operation, a method so-called differential push-pull is recently employed in order to improve accuracy, which is a method providing the tracking control operation utilizing a tracking error signal acquired not only from the sub-beams S1 and S2 but also the main-beam light-receiving portion MD irradiated with the main beam M.

A configuration is such that the tracking error signal by this method is acquired by subtracting a sub-tracking error signal acquired from the preceding sub-beam light-receiving portion SD1 and the following sub-beam light-receiving portion SD2 from a main tracking error signal acquired from the main-beam light-receiving portion MD.

A description is given with reference to the reference numerals of the depicted sensor units. If the main tracking error signal is denoted by MTE, MTE=(A+B)−(C+D), and if the sub-tracking error signal is denoted by STE, $$STE=\{(E+F)-(G+H)\}+\{(I+J)-(L+K)\}.$$

The tracking control operation by such a differential push-pull method is performed based on a differential push-pull signal DPP, and this DPP signal is acquired by DPP=MTE−k2×STE, where k2 is a constant which is determined based on the light intensity of the main beam and the light intensity of the sub-beams.

Such an optical pickup apparatus has been developed, which is configured to perform the tracking control operation using a combination of the sub-beams and the main beam as described above.

The focus error signal and the tracking error signal are generated from the signals acquired from the main-beam light-receiving portion MD, the preceding sub-beam light-receiving portion SD1, and the following sub-beam light-receiving portion SD2, as described above, to perform the focusing control operation and the tracking control operation based on the focus error signal and the tracking error signal, and the focusing control operation is performed by displacing an objective lens 8 perpendicularly to the signal surface of the optical disc D, and the tracking control operation is performed by displacing the objective lens 8 in the radial direction of the optical disc D.

The optical pickup apparatus is configured as described above, and a description will then be given of a problem caused by return light, i.e., stray light, reflected from an other signal recording layer in a state where an operation of reading signals recorded on one signal recording layer is being performed.

FIG. 7 depicts a relationship between the stray light and the main-beam light-receiving portion MD, the preceding sub-beam light-receiving portion SD1, and the following sub-beam light-receiving portion SD2, described above, and a portion inside a ring P depicted by a broken line is an irradiation portion of a stray light beam.

As apparent from this figure, the stray light beam spreads in a wide range and is applied onto the main-beam light-receiving portion MD, the preceding sub-beam light-receiving portion SD1, and the following sub-beam light-receiving portion SD2 provided in a photodetector 10.

The zero-order light of the main beam and the plus first-order diffracted light and the minus first-order diffracted light of the sub-beams are generated by a diffraction grating 2, and the light amount ratio thereof, i.e., a light amount ratio of one sub-beam and the main beam is commonly set at about 1:15. Therefore, for example, when the operation of reading signals recorded on a signal recording layer L0 is performed, the light amount of the sub-beams reflected as the stray light from a signal recording layer L1 is sufficiently small as compared to the light amount of the main beam reflected as the stray light, thereby being able to ignore an influence on the focusing control operation, etc.

The light amount of the main beam M applied to the main-beam light-receiving portion MD, i.e., the main beam M reflected from the signal recording layer L0 is sufficiently greater than the light amount of the stray light beam reflected from the signal recording layer L1, thereby not adversely affecting the signal generating operation of the main-beam light-receiving portion MD, i.e., the operation of reading signals recorded on the signal recording layer L0 and the operation of generating the focus error signal.

On the other hand, the light amounts of the preceding sub-beam S1 and the following sub-beam S2, which are applied to the preceding sub-beam light-receiving portion SD1 and the following sub-beam light-receiving portion SD2 to generate the focus error signal as described above, are set smaller than the light amount of the main beam M. Therefore, a gain of an amplifier provided to amplify the signals acquired from the preceding sub-beam light-receiving portion SD1 and the following sub-beam light-receiving portion SD2, is commonly set higher than a gain of an amplifier provided to amplify the signal acquired from the main-beam light-receiving portion MD.

As a result, this increases an influence exerted by the stray light, generated from the main beam M reflected from the signal recording layer L1, being applied to the preceding sub-beam light-receiving portion SD1 and the following sub-beam light-receiving portion SD2. That is to say, since a signal corresponding to the light intensity of the stray light acts on the focus error signal acquired from the preceding sub-beam light-receiving portion SD1 and the following sub-beam light-receiving portion SD2, the accurate focus error signal cannot be acquired, resulting in unstable focusing control operation, which causes a problem.

The influence of the stray light is also exerted when the tracking error signal is generated from the signals acquired from the preceding sub-beam light-receiving portion SD1 and the following sub-beam light-receiving portion SD2 and the tracking control operation is performed using this tracking error signal, thereby not being able to perform the tracking control operation accurately, which causes a problem.

A technique of forming a shape of a photodetector into such a shape as to eliminate the influence of stray light has been developed as a method of solving the problems caused by stray light (Patent Document 1: Japanese Laid-Open Patent Publication No. 2009-176367). A technique of utilizing a hologram element having polarization selectivity has been developed (Patent Document 2: Japanese Laid-Open Patent Publication No. 2009-76187).

The Patent Document 1 describes a technique of solving the problems caused by stray light by reducing areas of sub-beam light-receiving portions relative to an area of a main-beam light-receiving portion included in a photodetector, however, it is required to work and manufacture with precision, which causes difficulty in manufacturing.

The Patent Document 2 describes a technique of solving the problems caused by stray light utilizing a hologram element having divided areas, however, such a technique uses an expensive hologram element, thereby not only increasing cost but also requiring an adjustment mechanism for adjusting a position of the hologram element.

SUMMARY OF THE INVENTION

An optical pickup apparatus according to an aspect of the present invention, includes: a laser diode configured to emit a laser beam to read signals recorded on a first signal recording layer and a second signal recording layer included in an optical disc, the optical disc having the first signal recording layer at a first distance from a surface thereof and a second signal recording layer at a second distance, different from the first distance, from the surface thereof; an objective lens configured to focus the laser beam emitted from the laser diode on either the first signal recording layer or the second signal recording layer; a diffraction grating arranged on an optical path between the laser diode and the objective lens, the diffraction grating configured to output the laser beam emitted from the laser diode as a main beam of zero-order light, a first sub-beam of plus first-order diffracted light, and a second sub-beam of minus first-order diffracted light; a photodetector including a main-beam light-receiving portion irradiated with reflected light of the main beam reflected from the first signal recording layer or the second signal recording layer, a first sub-beam light-receiving portion irradiated with reflected light of the first sub-beam reflected from the first signal recording layer or the second signal recording layer, and a second sub-beam light-receiving portion irradiated with reflected light of the second sub-beam reflected from the first signal recording layer or the second signal recording layer, the first sub-beam light-receiving portion and the second sub-beam light-receiving portion arranged in line with the main-beam light-receiving portion interposed therebetween; a polarizing member arranged on an optical path between the diffraction grating and the objective lens, the polarizing member configured to guide, toward the objective lens, the laser beam incident from the diffraction grating, and guide, toward the photodetector, reflected light of the laser beam reflected from the first signal recording layer and the second signal recording layer of the optical disc; and a quarter-wave plate arranged on an optical path between the polarizing member and the objective lens, the quarter-wave plate configured to convert the laser beam incident from the polarizing member from linearly polarized light into circularly polarized light, and convert the reflected light of the laser beam incident from the objective lens from circularly polarized light into linearly polarized light, the quarter-wave plate having either a second area or a third area formed in a portion of a first area, the first area forming the entire quarter-wave plate, the second area allowing the reflected light of the laser beam to pass therethrough without polarization, the third area allowing the reflected light of the laser beam to pass therethrough at a polarization angle different from a polarization angle of the first area, the polarizing member having a separate light amount ratio set therefor with respect to the reflected light of the laser beam passing through the second area or the third area of the quarter-wave plate and the reflected light of the laser beam passing through an area excluding the second area or the third area from the first area of the quarter-wave plate, such that proportions of the reflected lights passing therethrough toward the photodetector are different, so as to decrease an irradiation level at a time when the first sub-beam light-receiving portion and the second sub-beam light receiving portion are irradiated with the reflected light of the laser beam as stray light, the reflected light reflected from either one layer, not subjected to a signal reading operation, of the first signal recording layer and the second signal recording layer.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

In an optical pickup apparatus configured to focus a laser beam to form a laser spot on a plurality of signal recording layers included in an optical disc, and such an optical pickup apparatus is provided, which can suppress influence of a laser beam, i.e., stray light, that is reflected from a signal recording layer other than a signal recording layer subjected to a signal reading operation.

An optical pickup apparatus according to an embodiment of the present invention includes: an objective lens to focus a laser beam onto signal recording layers to read signals recorded on a plurality of signal recording layers provided in an optical disc; a diffraction grating on which the laser beam is incident and which generates a main beam that is zero-order light and sub-beams that are plus first-order diffracted light and minus first-order diffracted light; a photodetector in which a main-beam light-receiving portion irradiated with the main beam reflected from a signal recording layer and first and second sub-beam light-receiving portions irradiated with the sub-beams reflected from the signal recording layer are arranged in the same straight line; a polarizing member configured to guide, toward the objective lens, the laser beam emitted from a laser diode, and guide, toward the photodetector, return light reflected from the signal recording layer of the optical disc; and a quarter-wave plate which is arranged between the polarizing member and the objective lens, and which converts the laser beam incident from the laser diode side from linearly polarized light into circularly polarized light, and converts the return light incident from the objective lens side from circularly polarized light into linearly polarized light, and the optical pickup apparatus is configured to decrease a level of irradiation on the sub-beam light-receiving portions of stray light that is the laser beam reflected from the signal recording layer not subjected to the signal reading operation, by forming a non-polarizing area in a portion of an area allowing the laser beam to pass therethrough in the quarter-wave plate and by setting a separate light amount ratio for the polarizing member with respect to the return light, having passed through the quarter-wave plate, passing therethrough toward the photodetector.

An optical pickup apparatus according to an embodiment of the present invention is characterized by including an objective lens to focus a laser beam onto signal recording layers to read signals recorded on a plurality of signal recording layers provided in an optical disc; a diffraction grating on which the laser beam is incident and which generates a main beam that is zero-order light and sub-beams that are plus first-order diffracted light and minus first-order diffracted light; a photodetector in which a main-beam light-receiving portion irradiated with the main beam reflected from the signal recording layer and first and second sub-beam light-receiving portions irradiated with the sub-beams reflected from the signal recording layer are arranged in the same straight line; a polarizing member to guide, toward the objective lens, the laser beam emitted from a laser diode, and guide, toward the photodetector, return light reflected from the signal recording layer of the optical disc; and a quarter-wave plate which is arranged between the polarizing member and the objective lens, and which converts the laser beam incident from the laser diode side from linearly polarized light into circularly polarized light, and converts the return light incident from the objective lens side from circularly polarized light into linearly polarized light, and the apparatus is characterized by decreasing a level of irradiation on the sub-beam light-receiving portions of stray light that is the laser beam reflected from the signal recording layer not subjected to a signal reading operation by forming a differently-polarizing area having a different polarization angle in a portion of an area allowing the laser beam to pass therethrough in the quarter-wave plate and by setting a separate light amount ratio for the polarizing member with respect to the return light, having passed through the quarter-wave plate, passing therethrough toward the photodetector.

Further, in the optical pickup apparatus according to an embodiment of the present invention, the polarizing member includes a semitransparent mirror or a polarizing beam splitter.

Further, in the optical pickup apparatus according to an embodiment of the present invention, the non-polarizing area or the differently-polarizing area formed in the quarter-wave plate is formed in a slit shape provided passing through (i.e., including) the center of an optical axis.

Further, in the optical pickup apparatus according to an embodiment of the present invention, a direction of the slit-shaped non-polarizing area or differently-polarizing area in which the level of irradiation of the stray light is decreased is identical to a direction in which the first and second sub-beam light-receiving portions and the main-beam light-receiving portion are arranged on the photodetector.

Further, in the optical pickup apparatus according to an embodiment of the present invention, a polarizing area is provided in a center portion of the slit-shaped non-polarizing area or differently-polarizing area.

Furthermore, in the optical pickup apparatus according to an embodiment of the present invention, a width of the slit is set such that such a width of the stray light as to be decreased in the level of irradiation is greater than a width perpendicular to the direction in which the first and second sub-beam light-receiving portions and the main-beam light-receiving portion are arranged.

The optical pickup apparatus according to an embodiment of the present invention is configured to suppress the influence of the stray light that is the laser beam reflected from the signal recording layer not subjected to the signal reading operation by forming the non-polarizing area or the differently-polarizing area in a portion in an area allowing the laser beam to pass therethrough in the quarter-wave plate and by setting a separated light amount for the polarizing member with respect to the return light, having passed through the quarter-wave plate, passing therethrough toward the photodetector, thereby solving the problems caused by stray light, and thus has an advantage of being manufactured inexpensively.

First Embodiment

Figure 4:
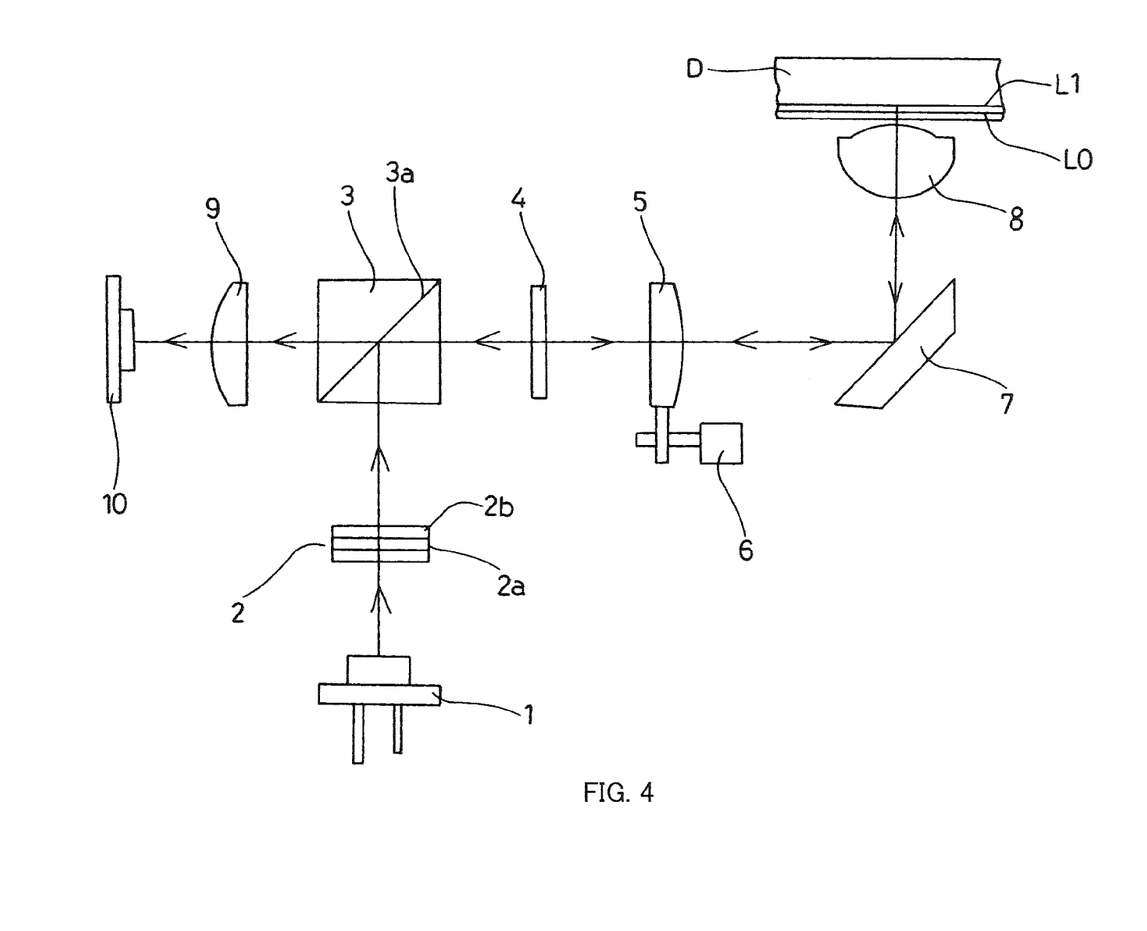
FIG. 4 is a schematic view illustrating another example of an optical arrangement of an optical pickup apparatus according to an embodiment of the present invention.

In FIG. 4, reference numeral 1 denotes a laser diode to emit a laser beam which is blue-violet light having a wavelength of 405 nm, for example. Reference numeral 2 denotes a diffraction grating on which the laser beam emitted from the laser diode 1 is incident, and the diffraction grating includes: a diffraction grating unit 2a configured to split the laser beam into a main beam of zero-order light and two sub-beams of plus first-order diffracted light and minus first-order diffracted light; and a half-wave plate 2b configured to convert the incident laser beam into linearly polarized light in an S-direction.

Reference numeral 3 denotes a polarizing beam splitter (polarizing member) on which the laser beam having passed through the diffraction grating 2 is incident, and the polarizing beam splitter includes a control film 3a to reflect a large portion of the laser beam converted into S-polarized light and allow the laser beam polarized in a P-direction to pass therethrough.

Reference numeral 4 denotes a quarter-wave plate which is provided at a position where the laser beam reflected by the control film 3a of the polarizing beam splitter 3 is incident, and the quarter-wave plate has a function of converting the incident laser beam from linearly polarized light into circularly polarized light, and in an opposite manner, from circularly polarized light into linearly polarized light. Reference numeral 5 denotes a collimating lens on which the laser beam having passed through the quarter-wave plate 4 is incident and which converts the incident laser beam into parallel light, and the collimating lens is configured to be displaced in an optical axis direction by an aberration correcting motor 6. A configuration is such that an operation of displacing the collimating lens 5 in the optical axis direction enables correction of spherical aberration caused by a thickness of a protective layer provided between signal recording layers L0, L1 and a disc surface of an optical disc D.

Reference numeral 7 denotes a raising mirror provided at a position where the laser beam having passed through the collimating lens 5 is incident thereon, and the raising mirror has a function of changing a direction of outputting the incident laser beam by 90 degrees, and reflecting the laser beam toward an objective lens 8 which is provided to focus the laser beam on the signal recording layer L0 or L1 of the optical disc D.

In such a configuration, a laser beam emitted from the laser diode 1 is incident on the objective lens 8 via the diffraction grating 2, the polarizing beam splitter 3, the quarter-wave plate 4, the collimating lens 5, and the raising mirror 7, and then is applied as a laser spot to the signal recording layer L0 or L1 of the optical disc D through the focusing operation of the objective lens 8, and the laser beam applied to the signal recording layer L0 or L1 is reflected as return light toward the objective lens 8.

The return light reflected from the signal recording layer L0 or L1 of the optical disc D is incident on the control film 3a of the polarizing beam splitter 3 through the objective lens 8, the raising mirror 7, the collimating lens 5, and the quarter-wave plate 4. The return light incident on the control film 3a of the polarizing beam splitter 3 as such has been changed to linearly polarized light in the P-direction by phase changing operation of the quarter-wave plate 4. Therefore, such return light is not reflected by the control film 3a and passes through the control film 3a as a control laser beam.

Reference numeral 9 denotes a sensor lens on which the control laser beam having passed through the control film 3a of the polarizing beam splitter 3 is incident, and the sensor lens has a function of applying the control laser beam with astigmatism added, to a light-receiving portion provided on a photodetector 10, which is called PDIC. The photodetector 10 includes a four-divided sensor, which will be described later, etc., and is configured to perform: a signal generating operation associated with an operation of reading signals recorded on the signal recording layer L0 or L1 of the optical disc D; an operation of generating a focus error signal for performing a focus control operation; and an operation of generating a tracking error signal for performing a tracking control operation.

Figure 3:
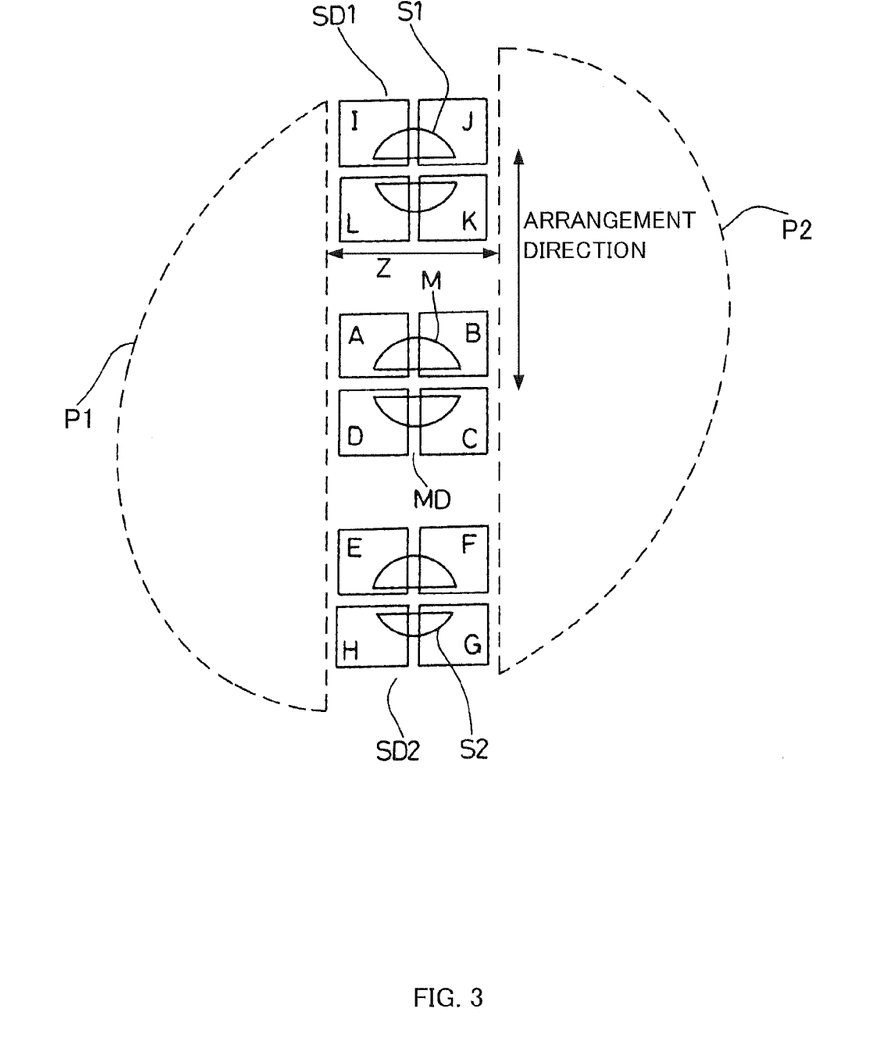
FIG. 3 is a diagram for explaining a relationship between a photodetector and a laser beam of an optical pickup apparatus according to an embodiment of the present invention.
Figure 6:
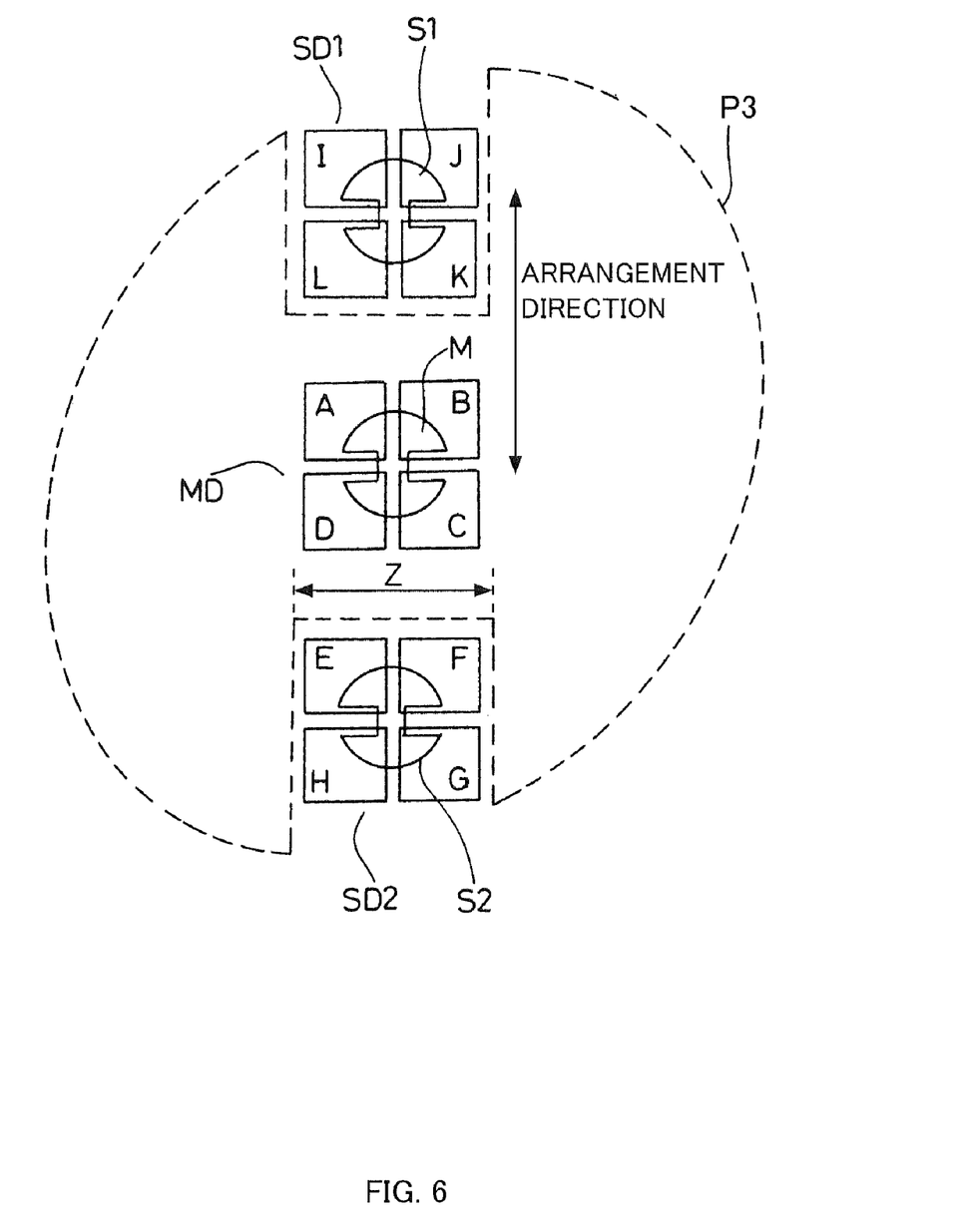
FIG. 6 is a diagram for explaining another relationship between a photodetector and a laser beam of an optical pickup apparatus according to an embodiment of the present invention.

The light-receiving portion provided on the photodetector 10 includes: a main-beam light-receiving portion MD, which is irradiated with a main beam M of the zero-order light; a first sub-beam light-receiving portion SD1, which is irradiated with a preceding sub-beam S1 of the plus first-order diffracted light; and a second sub-beam light-receiving portion SD2, which is irradiated with a following sub-beam S2 of the minus first-order diffracted light, as depicted in FIGS. 3 and 6.

Each of the light-receiving portions MD, SD1, and SD2 of the photodetector 10 includes a four-divided sensor which is divided into four by two dividing lines orthogonal to each other, and the signal generating operation, the operation of generating the focus error signal, and the operation of generating the tracking error signal are performed using required light-receiving outputs of the sensors.

Figure 2:
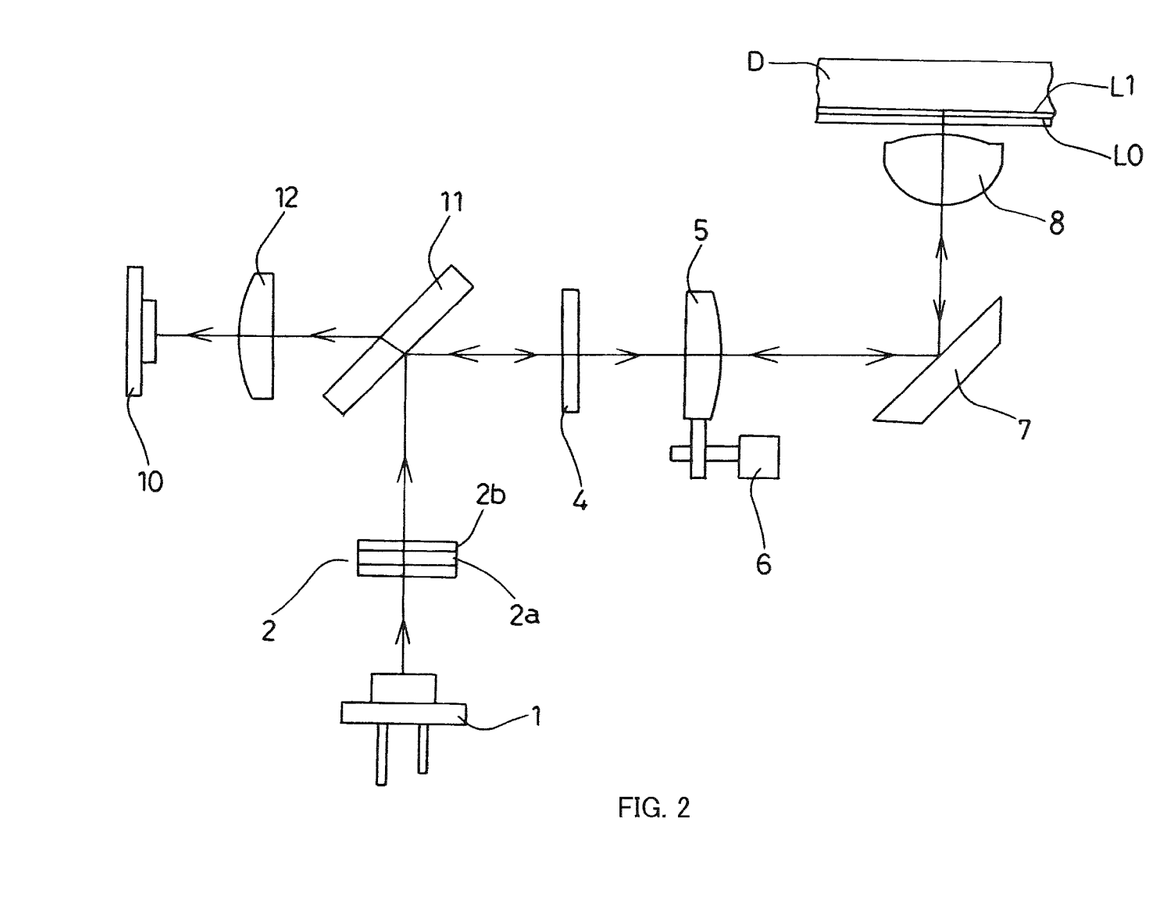
FIG. 2 is a schematic view illustrating an optical arrangement of an optical pickup apparatus according to an embodiment of the present invention.

For example, a method employed as a focus control method is an astigmatic method, which uses only the main-beam light-receiving portion MD; a differential astigmatic method, which uses the first sub-beam light-receiving portion SD1 and the second sub-beam light-receiving portion SD2 as well as the main-beam light-receiving portion MD; or a three-beam method, which uses only the first sub-beam light-receiving portion SD1 and the second sub-beam light-receiving portion SD2. A method employed as a tracking control method is a phase difference method or a push-pull method, which uses only the main-beam light-receiving portion MD; or a differential push-pull method, which uses the first sub-beam light-receiving portion SD1 and the second sub-beam light-receiving portion SD2 as well as the main-beam light-receiving portion MD. Each of the light-receiving portions MD, SD1, and SD2 of the photodetector 10 includes a four-divided sensor and has a configuration supporting the differential astigmatic method of the focus control method, however, in the case of not supporting the differential astigmatic method, the first sub-beam light-receiving portion SD1 and the second sub-beam light-receiving portion SD2 each may include a two-divided sensor so as to support the differential push-pull method. FIG. 2 is a schematic view of an example illustrating an optical arrangement of the optical pickup apparatus according to an embodiment of the present invention, and illustrates a specific example of implementation thereof in an optical pickup apparatus configured so as to read signals recorded on the signal recording layer L0 or L1 provided on the two-layered optical disc D specified by the Blu-ray standard. In FIG. 2, components equivalent to those in FIG. 4 are denoted by the same reference numerals.

In FIG. 2, reference numeral 11 denotes a semitransparent mirror on which the laser beam having passed through the diffraction grating 2 is incident, and the semitransparent mirror is configured to reflect a large portion of the laser beam converted into the S-polarized light and allow the laser beam polarized in the P-direction to pass therethrough.

In such a configuration, a laser beam emitted from the laser diode 1 is incident on the objective lens 8 via the diffraction grating 2, the semitransparent mirror 11, the quarter-wave plate 4, the collimating lens 5, and the raising mirror 7, and thereafter is applied as a laser spot to the signal recording layer L0 or L1 of the optical disc D through the focusing operation of the objective lens 8, and the laser beam applied onto the signal recording layer L0 or L1 is reflected as return light toward the objective lens 8.

The return light reflected from the signal recording layer L0 or L1 of the optical disc D is incident on the semitransparent mirror 11 via the objective lens 8, the raising mirror 7, the collimating lens 5, and the quarter-wave plate 4. The return light incident on the semitransparent mirror 11 as such has been converted into linearly polarized light in the P-direction through the phase changing operation of the quarter-wave plate 4. Therefore, such return light is not reflected by the semitransparent mirror 11, and is allowed to pass through the semitransparent mirror 11 as a control laser beam.

Reference numeral 12 denotes an anamorphic lens on which the control laser beam having passed through the semitransparent mirror 11 is incident, and the anamorphic lens has a function of adding and adjusting the astigmatism to the control laser beam and applying the control laser beam with astigmatism corrected to a light-receiving portion provided in the photodetector 10, which is called PDIC. The photodetector 10 is provided with a four-divided sensor, etc., as is the case with an embodiment of FIG. 4, and is configured to perform the signal generating operation associated with the operation of reading signals recorded on the signal recording layer L0 or L1 of the optical disc D and the operation of generating the focus error signal for performing the focus control operation by the astigmatic method through the operation of irradiation of the main beam, as well as the operation of generating the tracking error signal for performing the tracking control operation through the operation of irradiation of the two sub-beams. Such control operations for generating various signals are performed in the same manner as in an embodiment depicted in the above-described FIG. 7, and thus details thereof will be omitted.

The optical pickup apparatus according to an embodiment of the present invention is configured as described above, and the signal reading operation of the optical pickup apparatus having such a configuration will then be described.

When the operation of reading signals recorded on the first signal recording layer L0 is performed, a drive signal for acquiring preset laser output power is supplied from a laser diode drive circuit (not depicted) to the laser diode 1, so that the laser diode 1 emits a laser beam with desired output power.

The laser beam emitted from the laser diode 1 is incident on the diffraction grating 2, and is divided into a main beam and sub-beams by the diffraction grating unit 2a included in the diffraction grating 2, as well as converted into the linearly polarized light in the S-direction by the half-wave plate 2b. The laser beam having passed through the diffraction grating 2 is incident on the semitransparent mirror 11, and a large portion of the laser beam is reflected by the semitransparent mirror 11.

The laser beam reflected by the semitransparent mirror 11 is incident on the quarter-wave plate 4, is converted from linearly polarized light into circularly polarized light, and then is incident on the collimating lens 5. The laser beam incident on the collimating lens 5 is converted into parallel light and is incident on the raising mirror 7.

The laser beam incident on the raising mirror 7 is reflected by the raising mirror 7, and then is incident on the objective lens 8. The laser beam is incident on the objective lens 8 through the above-described optical path as such, thereby performing the focusing operation by the objective lens 8. Through the focusing operation by the objective lens 8, a laser spot is formed on the signal recording layer L0 of the optical disc D, and at the same time, the laser beam is reflected as return light from the signal recording layer L0.

The return light reflected by the signal recording layer L0 is incident on the objective lens 8 from the optical disc D side, and the return light incident on the objective lens 8 is incident on the semitransparent mirror 11 via the raising mirror 7, the collimating lens 5, and the quarter-wave plate 4. The return light incident on the semitransparent mirror 11 has been converted into linearly polarized light in the P-direction by the quarter-wave plate 4, and thus the return light is not reflected by the semitransparent mirror 11 and all of the light passes through the semitransparent mirror 11 as a control laser beam.

The control laser beam, which is the return light having passed through the semitransparent mirror 11 from the signal recording layer L0, is incident on the anamorphic lens 12 and applied to the light-receiving portion provided in the photodetector 10 with the astigmatism added and adjusted by the anamorphic lens 12. As a result of irradiating the light receiving unit of the photodetector 10 with the control laser beam, detection signals, which are based on changes in positions and shapes of the irradiation spots of the main beam and the sub-beams, can be extracted from the four divided sensor etc., included in the light-receiving portion of the photodetector 10.

The operation of displacing the objective lens 8 in the focus direction and the operation of displacing it in the tracking direction can be controlled by generation of the focus error signal and the tracking error signal from the detection signals, thereby performing the focusing control operation of forming the laser spot of the desired shape on the signal recording layer L0 and the tracking control operation of causing the laser spot to follow the signal track provided on the signal recording layer L0.

The operation of reading signals recorded on the signal recording layer L0 of the optical disc D can be performed by performing the focusing control operation and the tracking control operation in the optical pickup apparatus, and a reproduction signal acquired by such a reading operation can be acquired as information data by demodulating an RF signal generated from the photodetector 10 in a well known manner.

The operation of reading signals recorded on the signal recording layer L0 is performed as described above, and the operation of reading signals recorded on the signal recording layer L1 can be performed in the same manner.

The operation of reading signals recorded on the signal recording layer L0 (first signal recording layer) or L1 (second signal recording layer) is performed in the optical pickup apparatus depicted in FIG. 2 as described above, however, there is such a problem that the return light reflected from the signal recording layer, not subjected to the signal reading operation, is applied as stray light to the light-receiving portion provided in the photodetector 10 and adversely affects the focus control operation etc., as described above.

Figure 1:
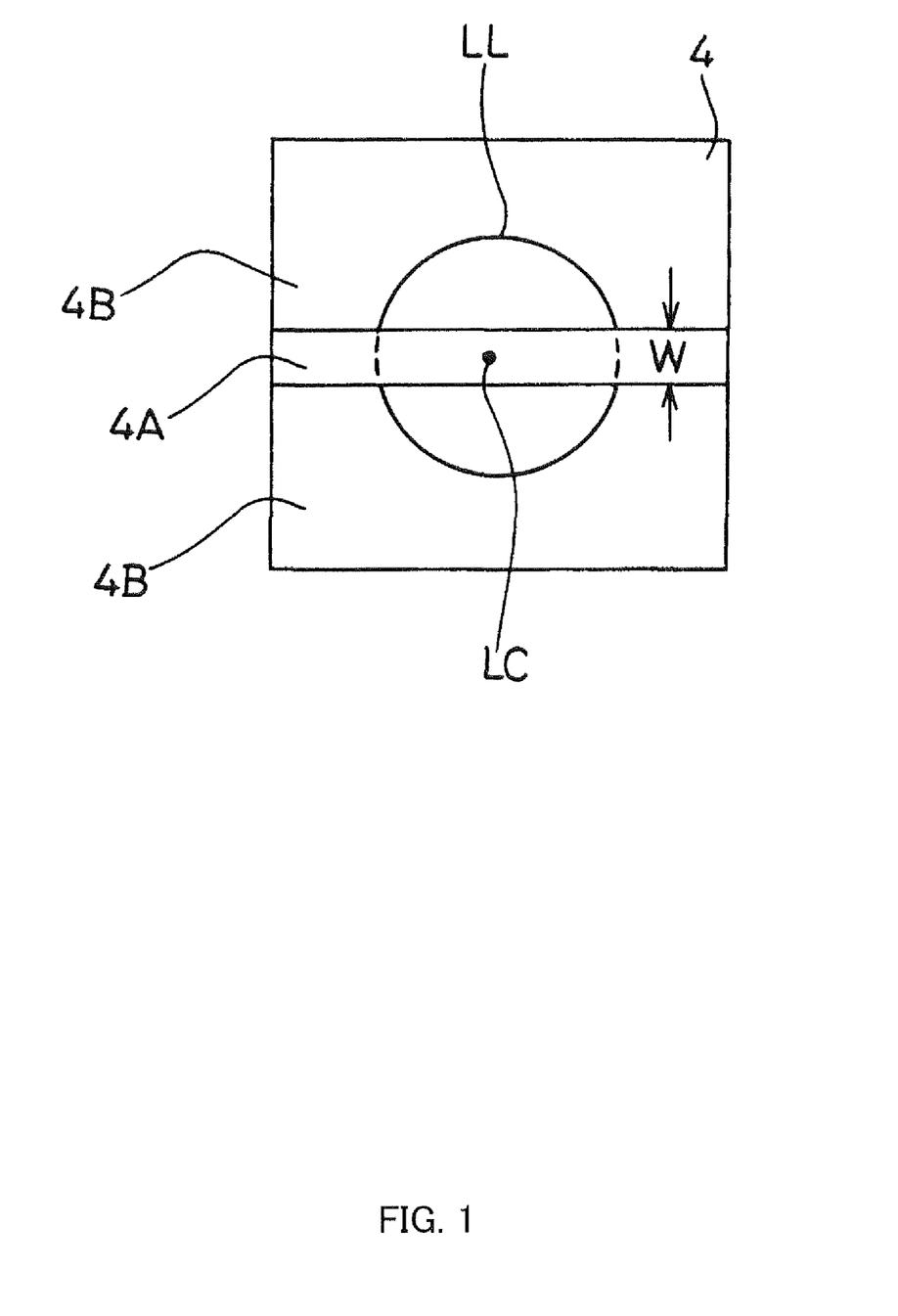
FIG. 1 is a plan view illustrating a quarter-wave plate used in an optical pickup apparatus according to an embodiment of the present invention.

In an embodiment of the present invention, the quarter-wave plate 4 and the semitransparent mirror 11 are provided with following characteristics so that the reflected light of the laser beam reflected from the signal recording layer (e.g., L1), not subjected to the signal reading operation, is not applied as stray light to the first sub-beam light-receiving portion SD1 and the second sub-beam light-receiving portion SD2. As depicted in FIG. 1, an intermediate area 4A (second area), which is a portion of the entire area (first area) of the quarter-wave plate 4 and which is provided passing through (i.e., including) the center of the optical axis of the reflected laser beam passing through the quarter-wave plate 4 is provided in a continuous manner in a slit shape, i.e., a band shape, as a non-polarizing area 4A where the polarizing operation is not performed. The semitransparent mirror 11 has a separate light amount ratio set therefor with respect to the reflected laser beam passing through the non-polarizing area 4A of the quarter-wave plate 4 and the reflected laser beam passing through a polarizing area 4B excluding the non-polarizing area 4A of the quarter-wave plate 4 such that proportions of the reflected laser beams passing therethrough toward the photodetector 10 are different.

The non-polarizing area 4A is provided passing through (i.e., including) the center LC of the optical axis of a light flux LL through which the laser beam passes, as depicted. The longitudinal direction of the non-polarizing area 4A is a direction optically corresponding to a direction of the signal track of the optical disc. For example, the longitudinal direction of the non-polarizing area 4A may be identical to the direction of the signal track of the optical disc. Further, the non-polarizing area 4A has the longitudinal direction, which is a direction of an area where the stray light is decreased in irradiation level, that is to say, the area is formed such that the direction optically correspond to a direction in which the first sub-beam light-receiving portion SD1, irradiated with the preceding sub-beam S1 of plus first-order diffracted light, the main-beam light-receiving portion MD, irradiated with the main beam M, and the second sub-beam light-receiving portion SD2, irradiated with the following sub-beam S2 of minus first-order diffracted light, are arranged in the same straight line as depicted in FIG. 3. For example, the longitudinal direction of the non-polarizing area 4A may be identical to the direction in which the light-receiving portions SD1, MD, and SD2 are arranged.

A width W in a direction orthogonal to the longitudinal direction of the non-polarizing area 4A optically corresponds to a width Z greater than a width in a direction orthogonal to the direction in which the first sub-beam light-receiving portion SD1, the main-beam light-receiving portion MD, and the second sub-beam light-receiving portion SD2, which are included in the photodetector 10, are arranged. In other words, as a value of the width W of the non-polarizing area 4A is increased, the width Z when the photodetector 10 is surrounded by broken lines P1 and P2 depicted in FIG. 3 is increased to be greater than a width of the light-receiving portions SD1, MD, and SD2. Therefore, if the width W of the non-polarizing area 4A is set such that the light-receiving portions SD1, MD, and SD2 are not irradiated with the stray light surrounded by the broken lines P1 and P2, the photodetector 10 is not affected by the stray light.

In such a configuration, the ratio in separate light amounts toward the photodetector 10 by the semitransparent mirror 11 is set such that, with respect to the return light having passed through the polarizing area 4B provided in the quarter-wave plate 4, 80% thereof passes therethrough and 20% thereof is reflected therefrom, while with respect to the return light having passed through the non-polarizing area 4A, 20% thereof passes therethrough and 80% thereof is reflected therefrom, for example.

The optical pickup apparatus according to an embodiment of the present invention is configured as described above, and a stray light suppressing operation of the optical pickup apparatus including the quarter-wave plate 4 and the semitransparent mirror 11 will then be described.

In the optical pickup apparatus having such a configuration, the laser beam applied to the signal recording layers and the return light reflected from the signal recording layers pass through the quarter-wave plate 4 in a reciprocating manner as described above. In the laser beam passing through the quarter-wave plate 4 in the reciprocating manner, the laser beam passing through the polarizing area 4B is converted into linearly polarized light in the P-direction, to be incident on the semitransparent mirror 11 as described above, while the laser beam passing through the non-polarizing area 4A is incident on the semitransparent mirror 11 as linearly polarized light in the S-direction.

When such a laser beam is incident on the semitransparent mirror 11, 80% of the linearly polarized light in the P-direction passes through the semitransparent mirror 11, and 20% of the linearly polarized light in the S-direction passes through the semitransparent mirror 11. That is to say, the light amount of the laser beam passing through the semitransparent mirror 11 is considerably reduced in the laser beam passing through the non-polarizing area 4A provided in the quarter-wave plate 4.

Therefore, in the optical pickup apparatus including the quarter-wave plate 4 provided with the non-polarizing area 4A and the semitransparent mirror 11 having the separate light amount ratio set therefor as described above, the main beam M, the preceding sub-beam S1, and the following sub-beam S2, which are reflected from the signal recording layer subjected to the signal reading operation, are applied onto the main-beam light-receiving portion MD, the first sub-beam light-receiving portion SD1, and the second sub-beam light-receiving portion SD2 as depicted in FIG. 3. A stray light area, which is irradiated with the stray light, i.e., the main beam reflected from the signal recording layer not subjected to the signal reading operation, results in ranges, as depicted by the broken lines P1 and P2 of FIG. 3, in which the light-receiving portions MD, SD1, and SD2 are not irradiated therewith, the ranges sandwiching the light-receiving portions MD, SD1, and SD2 of the photodetector 10 in a direction orthogonal to the direction in which they are arranged.

Accordingly, the stray light applied to the first sub-beam light-receiving portion SD1, the main-beam light-receiving portion MD, and the second sub-beam light-receiving portion SD2 is decreased in irradiation level in an embodiment described above, thereby not adversely affecting the operations of generating the focus error signal and the tracking error signal. Therefore, the focusing control operation and the tracking control operation can be performed without trouble, which can lead the signal reading operation to accurately be performed.

Further, in such a configuration, the width W of the non-polarizing area 4A formed in a band shape is set in consideration of the irradiation ranges in the first sub-beam light-receiving portion SD1, the main-beam light-receiving portion MD, and the second sub-beam light-receiving portion SD2 included in the photodetector 10 and the operations of generating the signals.

In such a configuration, the width W of the non-polarizing area 4A formed in a band shape and the separate light amount ratio of the semitransparent mirror 11 are set in consideration of a jitter value, etc., included in signals read from the optical disc.

An embodiment of the present invention has been described in the case where the semitransparent mirror 11 is used as the polarizing member guiding the laser beam emitted from the laser diode 1 toward the objective lens 8 as well as guiding the laser beam reflected from the optical disc toward the photodetector 10, however, it also can be implemented in the optical pickup apparatus including the polarizing beam splitter 3 depicted in FIG. 4.

In an embodiment of the present invention, the quarter-wave plate 4 is disposed between the polarizing member and the collimating lens 5, however, the quarter-wave plate 4 can also be disposed between the collimating lens 5 and the objective lens 8, for example, between the objective lens 8 and the raising mirror 7. If the quarter-wave plate 4 is disposed in the vicinity of the objective lens 8, lens shift can be supported by interlocking it with movement of the objective lens 8, which enables the improvement in characteristics of the optical pickup apparatus.

Second Embodiment

Since the non-polarizing area 4A described in a first embodiment is formed in a band shape, the laser beam in the center portion of the light flux LL may be decreased in level of irradiation onto the photodetector 10.

Figure 5:
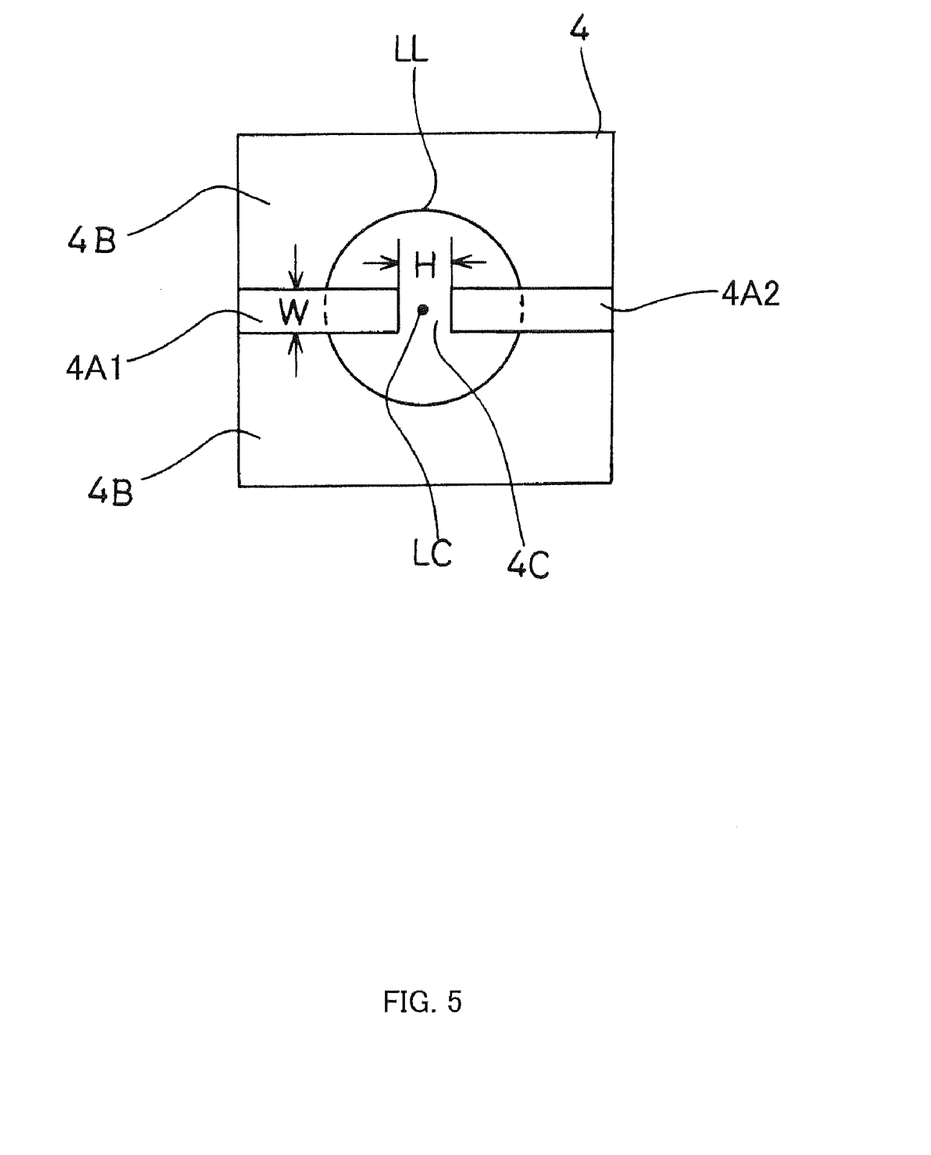
FIG. 5 is a plan view of another example of a quarter-wave plate used in an optical pickup apparatus according to an embodiment of the present invention.

A second embodiment provides a quarter-wave plate 4 improved in such a point. As depicted in FIG. 5, two non-polarizing areas 4A1 and 4A2 are areas corresponding to the non-polarizing area 4A of a first embodiment excluding a center area 4C passing through the center LC of the optical axis of the light flux LL, and this center area 4C is a polarizing area similarly to the polarizing area 4B. That is to say, the two non-polarizing areas 4A1 and 4A2 are formed in an intermediate location of the quarter-wave plate 4 with the center area 4C interposed therebetween. A longitudinal direction of the non-polarizing areas 4A1 and 4A2 is a direction optically corresponding to the direction of the signal track of the optical disc D as is the case with the longitudinal direction of the non-polarizing area 4A of the first embodiment. For example, the longitudinal direction of the non-polarizing areas 4A1 and 4A2 may be identical to the direction of the signal track of the optical disc D. The longitudinal direction of the non-polarizing areas 4A1 and 4A2 are a direction optically corresponding to a direction in which the light-receiving portions MD, SD1, included in the photodetector 10 are arranged. For example, the longitudinal direction of the non-polarizing areas 4A1 and 4A2 may be identical to the direction in which the light-receiving portions MD, SD1, and SD2 included in the photodetector 10 are arranged.

A width W in the direction orthogonal to the longitudinal direction of the non-polarizing areas 4A1 and 4A2 optically corresponds to a width Z greater than a width in a direction orthogonal to the direction in which the first sub-beam light-receiving portion SD1, the main-beam light-receiving portion MD, and the second sub-beam light-receiving portion SD2 included in the photodetector 10 are arranged. In other words, as a value of the width W of the non-polarizing areas 4A1 and 4A2 is increased, the width Z when the photodetector 10 is surrounded by broken line P3 depicted in FIG. 6 is increased to be greater than a width of the light-receiving portions SD1, MD, and SD2. Therefore, if the width W of the non-polarizing areas 4A1 and 4A2 is set such that the light-receiving portions SD1 and SD2 are not irradiated with the stray light surrounded by the broken line P3, the influence exerted by the stray light is decreased in the photodetector 10. FIG. 6 depicts an area of the stray light which is decreased in irradiation level by the quarter-wave plate 4 having such a configuration, and the area indicated by the broken line P3 is irradiated with the stray light.

The quarter-wave plate 4 according to a second embodiment of the present invention has the center area 4C formed as the polarizing area, and thus the main-beam light-receiving portion MD is irradiated with the stray light drawn by the broken line P3. That is to say, the area of the stray light, which is decreased in irradiation level by the non-polarizing areas 4A1 and 4A2, is limited to the first sub-beam light-receiving portion SD1 and the second sub-beam light-receiving portion SD2, and the stray light applied to the main-beam light-receiving portion MD is not decreased.

However, since the light amount of the main beam M applied to the main-beam light-receiving portion MD is far greater than the light amount of the stray light, the stray light does not have an influence thereon and thus the signal generating operations are unaffected.

With the quarter-wave plate 4 according to a second embodiment of the present invention, the stray light applied to the first sub-beam light-receiving portion SD1 and the second sub-beam light-receiving portion SD2 is decreased in level, thereby being able to accurately perform the operations of generating the focus error signal and the tracking error signal.

The quarter-wave plate 4 according to such an embodiment of the present invention has the center area 4C formed as the polarizing area, which does not cause a shortage of the light amount of the return light applied to the main-beam light-receiving portion MD, the first sub-beam light-receiving portion SD1, and the second sub-beam light-receiving portion SD2 provided in the photodetector 10.

In an embodiment of the present invention, the width W of the non-polarizing areas 4A1 and 4A2 provided in the quarter-wave plate 4, a width H of the center area 4C provided between the non-polarizing areas 4A1 and 4A2 (a length in the longitudinal direction of the non-polarizing areas 4A1 and 4A2), and the separate light amount ratio of the semitransparent mirror 11 are set in consideration of a jitter value, etc., included in signals read from the optical disc.

Third Embodiment

In a first embodiment and a second embodiment of the present invention, the belt-shaped non-polarizing area 4A or the non-polarizing areas 4A1 and 4A2 are formed in the quarter-wave plate 4 in order to solve the problems caused by the stray light, however, the problems caused by the stray light can be solved by forming a differently-polarizing area having a polarization angle different from a polarization angle of the polarizing area 4B in the same area as the non-polarizing area 4A or the non-polarizing areas 4A1 and 4A2. With such a configuration, a polarization angle of the stray light is different from a polarization angle of the laser beam used for the signal reading operation, and thus the problems caused by the stray light can be solved by setting a separate light amount ratio using the polarizing member.

With such a configuration, characteristics are such that a shielding ratio in the light amounts can freely be selected by adjusting and setting the polarization angle of the differently-polarizing area, and generation of side lobe on the outward path can be more suppressed as the polarization angle thereof is brought closer to an angle of the polarizing area 4B, which is advantageous in a case where jitter is to be suppressed.

First, second, and third embodiments according to the present invention describe cases of being implemented in the optical pickup apparatus which is configured to perform an operation of reading signals recorded in an optical disc of the Blu-ray standard, however, the embodiments are applicable to optical pickup apparatuses of different standards. Further, an optical disc including two signal recording layers has been described, however, embodiments according to the present invention are applicable to an optical pickup apparatus which is configured to perform an operation of reading signals recorded in an optical disc including still more signal recording layers.

Although there is a fear of degradation with respect to jitter in signals read from the optical disc D which is caused by the non-polarizing areas (differently-polarizing areas) 4A, 4A1, and 4A2, it is confirmed that reading signals from the optical disc D can be performed sufficiently.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
   a laser diode configured to emit a laser beam to read signals recorded on a first signal recording layer and a second signal recording layer included in an optical disc, the optical disc having the first signal recording layer at a first distance from a surface thereof and a second signal recording layer at a second distance, different from the first distance, from the surface thereof;
   an objective lens configured to focus the laser beam emitted from the laser diode on either the first signal recording layer or the second signal recording layer;
   a diffraction grating arranged on an optical path between the laser diode and the objective lens, the diffraction grating configured to output the laser beam emitted from the laser diode as a main beam of zero-order light, a first sub-beam of plus first-order diffracted light, and a second sub-beam of minus first-order diffracted light;
   a photodetector including a main-beam light-receiving portion irradiated with reflected light of the main beam reflected from the first signal recording layer or the second signal recording layer, a first sub-beam light-receiving portion irradiated with reflected light of the first sub-beam reflected from the first signal recording layer or the second signal recording layer, and a second sub-beam light-receiving portion irradiated with reflected light of the second sub-beam reflected from the first signal recording layer or the second signal recording layer, the first sub-beam light-receiving portion and the second sub-beam light-receiving portion arranged in line with the main-beam light-receiving portion interposed therebetween;
   a polarizing member arranged on an optical path between the diffraction grating and the objective lens, the polarizing member configured to guide, toward the objective lens, the laser beam incident from the diffraction grating, and guide, toward the photodetector, reflected light of the laser beam reflected from the first signal recording layer and the second signal recording layer of the optical disc; and
   a quarter-wave plate arranged on an optical path between the polarizing member and the objective lens, the quarter-wave plate configured to convert the laser beam incident from the polarizing member from linearly polarized light into circularly polarized light, and convert the reflected light of the laser beam incident from the objective lens from circularly polarized light into linearly polarized light,
   the quarter-wave plate having either a second area or a third area formed in a portion of a first area, the first area forming the entire quarter-wave plate, the second area allowing the reflected light of the laser beam to pass therethrough without polarization, the third area allowing the reflected light of the laser beam to pass therethrough at a polarization angle different from a polarization angle of the first area,
   the polarizing member having a separate light amount ratio set therefor with respect to the reflected light of the laser beam passing through the second area or the third area of the quarter-wave plate and the reflected light of the laser beam passing through an area excluding the second area or the third area from the first area of the quarter-wave plate, such that proportions of the reflected lights passing therethrough toward the photodetector are different,
   so as to decrease an irradiation level at a time when the first sub-beam light-receiving portion and the second sub-beam light receiving portion are irradiated with the reflected light of the laser beam as stray light, the reflected light reflected from either one layer, not subjected to a signal reading operation, of the first signal recording layer and the second signal recording layer.

2. The optical pickup apparatus of claim 1, wherein the polarizing member includes a semitransparent mirror.

3. The optical pickup apparatus of claim 1, wherein the polarizing member includes a polarizing beam splitter.

4. The optical pickup apparatus of claim 1, wherein the second area in a band shape is formed in a continuous manner in an intermediate area on the quarter-wave plate, the intermediate area provided passing through a center of an optical axis, and
   a longitudinal direction of the second area is a direction optically corresponding to a direction of a signal track of the optical disc.

5. The optical pickup apparatus of claim 4, wherein the longitudinal direction of the second area is a direction optically corresponding to a direction in which the main-beam light-receiving portion, the first sub-beam light-receiving portion, and the second sub-beam light-receiving portion are arranged.

6. The optical pickup apparatus of claim 5, wherein a width of the second area in a direction orthogonal to the longitudinal direction thereof is a width optically corresponding to a width greater than a width in a direction orthogonal to the direction in which the main-beam detecting light-receiving portion, the first sub-beam light-receiving portion, and the second sub-beam light-receiving portion are arranged, and the width thereof is such a width that the main-beam light-receiving portion, the first sub-beam light-receiving portion, and the second sub-beam light-receiving portion are not irradiated, as stray light, with the reflected light of the laser beam reflected from either one layer, not subjected to a signal reading operation, of the first signal recording layer and the second signal recording layer.

7. The optical pickup apparatus of claim 1, wherein the second area in a band shape are formed in an intermediate area provided passing through a center of an optical axis on the quarter-wave plate, the second area provided excluding an area of the center of the optical axis, and a longitudinal direction of the second area is a direction optically corresponding to a direction of a signal track of the optical disc.

8. The optical pickup apparatus of claim 7, wherein the longitudinal direction of the second area is a direction optically corresponding to a direction in which the main-beam light-receiving portion, the first sub-beam light-receiving portion, and the second sub-beam light-receiving portion are arranged.

9. The optical pickup apparatus of claim 8, wherein a width of the second area in a direction orthogonal to the longitudinal direction thereof is a width optically corresponding to a width greater than a width in a direction orthogonal to the direction in which the main-beam light-receiving portion, the first sub-beam light-receiving portion, and the second sub-beam light-receiving portion are arranged, and the width thereof is such a width that the first sub-beam light-receiving portion, and the second sub-beam light-receiving portion are not irradiated, as stray light, with the reflected light of the laser beam reflected from either one layer, not subjected to a signal reading operation, of the first signal recording layer and the second signal recording layer.

10. The optical pickup apparatus of claim 1, wherein the third area in a band shape is formed in a continuous manner in an intermediate area on the quarter-wave plate, the intermediate area provided passing through a center of an optical axis, and a longitudinal direction of the third area is a direction optically corresponding to a direction of a signal track of the optical disc.

11. The optical pickup apparatus of claim 10, wherein the longitudinal direction of the third area is a direction optically corresponding to a direction in which the main-beam light-receiving portion, the first sub-beam light-receiving portion, and the second sub-beam light-receiving portion are arranged.

12. The optical pickup apparatus of claim 11, wherein a width of the third area in a direction orthogonal to the longitudinal direction thereof is a width optically corresponding to a width greater than a width in a direction orthogonal to the direction in which the main-beam light-receiving portion, the first sub-beam light-receiving portion, and the second sub-beam light-receiving portion are arranged, and the width thereof is such a width that the main-beam light-receiving portion, the first sub-beam light-receiving portion, and the second sub-beam light-receiving portion are not irradiated, as stray light, with the reflected light of the laser beam reflected from either one layer, not subjected to a signal reading operation, of the first signal recording layer and the second signal recording layer.

13. The optical pickup apparatus of claim 1, wherein the third area in a band shape are formed in an intermediate area provided passing through a center of an optical axis on the quarter-wave plate, the third area provided excluding an area of the center of the optical axis, and a longitudinal direction of the third area is a direction optically corresponding to a direction of a signal track of the optical disc.

14. The optical pickup apparatus of claim 13, wherein the longitudinal direction of the third area is a direction optically corresponding to a direction in which the main-beam light-receiving portion, the first sub-beam light-receiving portion, and the second sub-beam light-receiving portion are arranged.

15. The optical pickup apparatus of claim 14, wherein a width of the third area in a direction orthogonal to the longitudinal direction thereof is a width optically corresponding to a width greater than a width in a direction orthogonal to the direction in which the main-beam light-receiving portion, the first sub-beam light-receiving portion, and the second sub-beam light-receiving portion are arranged, and the width thereof is such a width that the first sub-beam light-receiving portion, and the second sub-beam light-receiving portion are not irradiated, as stray light, with the reflected light of the laser beam reflected from either one layer, not subjected to a signal reading operation, of the first signal recording layer and the second signal recording layer.

* * * * *